(12) United States Patent
Köhler et al.

(10) Patent No.: US 11,835,017 B2
(45) Date of Patent: Dec. 5, 2023

(54) WATER DELIVERY MODULE

(71) Applicant: Vitesco Technologies GmbH, Regensburg (DE)

(72) Inventors: Cornelius Köhler, Munich (DE); Jan Hodgson, Munich (DE)

(73) Assignee: VITESCO TECHNOLOGIES GMBH, Regensburg (DE)

(*) Notice: Subject to any disclaimer, the term of this patent is extended or adjusted under 35 U.S.C. 154(b) by 0 days.

(21) Appl. No.: 17/801,734

(22) PCT Filed: Feb. 25, 2021

(86) PCT No.: PCT/EP2021/054703
§ 371 (c)(1),
(2) Date: Aug. 23, 2022

(87) PCT Pub. No.: WO2021/175700
PCT Pub. Date: Sep. 10, 2021

(65) Prior Publication Data
US 2023/0079805 A1    Mar. 16, 2023

(30) Foreign Application Priority Data

Mar. 2, 2020 (DE) ............ 10 2020 202 666.1

(51) Int. Cl.
*F02M 25/00* (2006.01)
*F02M 25/022* (2006.01)
(Continued)

(52) U.S. Cl.
CPC ...... *F02M 25/0221* (2013.01); *F02M 25/025* (2013.01); *F04B 53/08* (2013.01); *F04B 53/16* (2013.01); *F16L 55/24* (2013.01)

(58) Field of Classification Search
CPC .. F02M 25/0221; F02M 25/025; F04B 53/08; F04B 53/16; F16L 55/24; Y02T 10/12
(Continued)

(56) References Cited

U.S. PATENT DOCUMENTS 9,169,760 B2 * 10/2015 Maguin ............... F01N 3/208
9,482,390 B2 * 11/2016 Besnard .............. F16L 9/18
(Continued)

FOREIGN PATENT DOCUMENTS

CN       110566375      12/2019
DE     202007013316      2/2009
(Continued)

OTHER PUBLICATIONS

Office Action of corresponding German Patent Application No. 10 2020 202 666.1.
(Continued)

*Primary Examiner* — Hai H Huynh
(74) *Attorney, Agent, or Firm* — Cozen O'Connor

(57) ABSTRACT

A water-conveying module for injecting water into a combustion chamber of an internal combustion engine, having a conveying unit, which has a pump for conveying the water from a tank. The water can be conveyed by the pump to an injection point along a dosing line. The conveying unit has a water outlet through which water is conveyed out of the conveying unit. The water outlet is formed by a connection plug onto which the dosing line can be plugged, Water can be conveyed from the conveying unit into the dosing line along the connection plug that has a section which can be flowed through by the water and which is part of the fluid line from the conveying unit to the dosing line.

9 Claims, 1 Drawing Sheet

(51) Int. Cl.
*F02M 25/025* (2006.01)
*F04B 53/08* (2006.01)
*F04B 53/16* (2006.01)
*F16L 55/24* (2006.01)

(58) Field of Classification Search
USPC .................................. 123/25 A, 25 C, 470
See application file for complete search history.

(56) References Cited

U.S. PATENT DOCUMENTS

| | | | |
|---|---|---|---|
| 2011/0194987 A1* | 8/2011 | Hodgson | F01N 3/2066 422/187 |
| 2013/0263938 A1 | 10/2013 | Harr et al. | |
| 2020/0080520 A1* | 3/2020 | Op De Beeck | F02M 35/10209 |

FOREIGN PATENT DOCUMENTS

| | | |
|---|---|---|
| DE | 102008044708 | 3/2010 |
| DE | 102009040012 | 5/2010 |
| DE | 102008050431 | 6/2010 |
| DE | 102010028886 | 11/2011 |
| DE | 102010045714 | 3/2012 |
| DE | 212017000219 | 6/2019 |
| EP | 3324030 | 5/2018 |
| WO | WO 2014080266 | 5/2014 |

OTHER PUBLICATIONS

Office Action dated Jul. 13, 2023 issued in Chinese Patent Application No. 202180018354.7.

* cited by examiner

WATER DELIVERY MODULE

CROSS REFERENCE TO RELATED APPLICATIONS

This is a U.S. national stage of Application No. PCT/EP2021/054703 filed Feb. 25, 2021. Priority is claimed on German Application No. DE 10 2020 202 666.1 filed Mar. 2, 2020 the content of which is incorporated herein by reference

BACKGROUND OF THE INVENTION

1. Field of the Invention

The disclosure relates to a water-conveying module for injecting water into or upstream of the combustion chamber of an internal combustion engine, having a conveying unit, which has a pump, for conveying the water from a tank, wherein the water can be conveyed by the pump to an injection point along a dosing line, wherein the conveying unit has a water outlet through which water can be conveyed out of the conveying unit.

The disclosure relates to a device for injecting water into an internal combustion engine.

2. Description of the Prior Art

On account of increasing demands on reduced carbon dioxide emissions, internal combustion engines are increasingly being optimized with regard to their fuel consumption. However, known internal combustion engines cannot be optimally operated in terms of consumption at operating points with high load, since the operation is limited by knocking tendency and high exhaust-gas temperatures. A possible measure for reducing the knocking tendency and for lowering the exhaust-gas temperatures is the injection of water. Separate water-injection systems are commonly provided here to allow the water injection. In this regard, WO 2014/080266 A1, for example, has disclosed a water-injection system for an internal combustion engine with exhaust-gas recirculation, in which system the water is injected into the mass flow of the exhaust-gas recirculation.

Basically, water-conveying modules have for this purpose at least one tank for storing the water and, furthermore, suitable conveying devices, such as for example a pump, to conduct the water along suitable lines to the combustion chamber or to a point upstream of the combustion chamber.

Since water has a freezing point which, under the usual operating conditions of a motor vehicle, is generally reached, freezing of the water stored in the tank or of the water situated in the lines or in the conveying module can generally be expected, and for this reason it is necessary for precautionary measures that prevent damage to the water-conveying module as a whole to be adopted.

Expansion of water within a conveying line can, through freezing, amount to approximately 10% of the initial volume, and for this reason provision is generally made of conveying lines which can compensate for as large a proportion of this expansion as possible. Furthermore, it is attempted to keep the lines free of water as far as possible when not in use, so as to avoid freezing of the lines. Alternatively, provision is made at the conveying lines of compensation volumes, which are intended to compensate for the increase in volume.

A disadvantage of the solutions in the prior art is in particular that the provision of lines which are as flexible as possible gives rise to increased costs. Furthermore, highly flexible lines can also result in other negative properties for the conveying module. The provision of compensation volumes is technically highly cumbersome and worsens in particular the adaptability for conveying modules to different vehicles. Emptying of the conveying lines is cumbersome, since for example the conveying pump has to be specifically adapted to make it possible for the conveying lines to be emptied. Moreover, it is necessary for precautionary measures that prevent the pump drawing in air and running dry to be adopted. Furthermore, it is critical in particular if the pump starts up with air at the conveying element of the pump, since this increases the wear and furthermore a significantly higher rotational speed of the pump is required to ensure the conveyance of the water.

SUMMARY OF THE INVENTION

It is therefore the object of one aspect of the present invention to provide a water-conveying module that is particularly well protected against damage as a consequence of freezing of the water in the conveying module and in particular in the conveying lines.

An exemplary aspect of the invention relates to a water-conveying module for injecting water into or upstream of the combustion chamber of an internal combustion engine that has a conveying unit, having a pump, for conveying the water from a tank, wherein the water can be conveyed by the pump to an injection point along a dosing line, wherein the conveying unit has a water outlet through which water can be conveyed out of the conveying unit, wherein the water outlet is formed by a connection plug onto which the dosing line can be plugged, wherein water can be conveyed from the conveying unit into the dosing line along the connection plug, wherein the connection plug has a section which can be flowed through by the water and which is part of the fluid line from the conveying unit to the dosing line.

The connection plug may be formed for example by a fixed tube section, over which the dosing line is plugged. The dosing line can be fastened to the connection plug by a fixing element, such as for example a latching clip. The water is conveyed from the conveying unit by way of the pump, wherein the connection plug is arranged downstream of the pump exit in the conveying direction. Between the pump exit and the connection plug, the guide for the water to be conveyed, if the connection plug does not directly adjoin the pump exit, is formed by a line section, which is also referred to as outlet channel.

The connection plug has a through-flowable interior space delimited by a wall and which thus forms a section which can be flowed through by the water. The connection plug is preferably in the form of a rigid line section which is not elastic or which is only slightly elastic, and projects from the assembly formed by the conveying unit, the filter and the control electronics.

It is particularly advantageous if the through-flowable section has a line cross section which varies along a through-flow direction. The through-flowable section of the connection plug is normally flowed through in the direction from the conveying unit toward the dosing line. This constitutes the conveying direction for the water. In particular with the pump at a standstill, small backflows can occur, wherein the connection plug is then flowed through counter to the actual conveying direction.

If the ambient temperature drops below the freezing point of the water in the system, the water can freeze. In this case, the water can freeze for example in the region of the dosing line, in the region of the connection plug or in the region of the conveying unit. Generally, the water freezes firstly in the region of the connection plug since, unlike the dosing line and the conveying unit, said connection plug is normally not thermally insulated. In particular the region of the connection plug has little formed around it and is consequently exposed to the low temperatures in the surroundings.

The freezing of the water results in a significant increase in the volume of the water, whereby water is displaced within the line system, on the one hand, and, through the formation of the ice, additionally a volume is filled within the line system, on the other hand. Due to the freezing, it can thus occur that water is pushed from the connection plug in the direction of the conveying unit. It is also possible for small pieces of ice to be pushed in this direction. In particular the region defined as outlet channel, which is formed between the pump exit and the connection plug, is particularly susceptible to damage as a consequence of the water or ice that is pushed into it due to the freezing.

In particular in view of the fact that a valve frequently prevents water from flowing away from this region, extremely high pressures can occur in said region, which can cause damage.

The connection plug or the through-flowable section advantageously has a line cross section which varies along a throughflow direction, that is to say from one of its end regions to the other end region. This may be achieved for example by conical narrowing of the line cross section. Alternatively, regions limited in their extent may have a reduced line cross section, for example by way of a projection or shoulder that runs in an encircling manner in the circumferential direction.

An advantage of such a configuration is in particular that, through a suitable design of the line cross section, pushing of water and ice into the outlet channel can be reduced or completely avoided.

It is also advantageous if the through-flowable cross section of the through-flowable section narrows from the dosing line toward the conveying unit. This prevents in particular pushing of pieces of ice through the connection plug toward the conveying unit.

A preferred exemplary embodiment is characterized in that the through-flowable section has, in the flow direction from the conveying unit toward the dosing line, a line cross section which repeatedly narrows and increases again. Such a line cross section narrowing and widening again forms a type of filter element, which stops in particular solid bodies, such as for example pieces of ice.

It is also preferable if the through-flowable section has a sawtooth-like contour in a longitudinal section. A sawtooth-like contour, which is formed by sections running in an encircling manner in the circumferential direction and serrated in a radial direction, is particularly advantageously suitable for stopping pieces of ice, since these are caught at one of the serrated projections and are blocked there.

It is furthermore advantageous if the through-flowable section has a contour that increases the flow resistance more greatly in the flow direction from the dosing line toward the conveying unit than along the flow direction from the conveying unit toward the dosing line. In this way, conveyance of water and/or ice back in the direction of the conveying unit is made more difficult, whereas the conveyance of the water in the main conveying direction during operation is simplified.

It is furthermore advantageous if the through-flowable section forms a filter element for the fluid that can flow through the section, which filter element is formed by serrated pockets at the wall, which outwardly delimits the through-flowable section. The serrated pockets stop pieces of ice in that they form a physical resistance for them. Furthermore, the pressure loss generated by way of the pockets will reduce the flowing-back of water and/or ice.

It is also expedient if the minimum line cross section of the through-flowable section is smaller than the line cross section on the side of the conveying unit and is smaller than the line cross section of the dosing line. This ensures that, in particular in the region of the connection plug, a bottleneck which prevents the transport of ice toward the conveying unit is created.

Advantageous refinements of the present invention are described in the dependent claims and in the following description of the figures.

BRIEF DESCRIPTION OF THE DRAWINGS

The invention will be discussed in detail below on the basis of exemplary embodiments with reference to the drawings. In the drawings.

DETAILED DESCRIPTION OF THE PRESENTLY PREFERRED EMBODIMENTS

Figure 1:
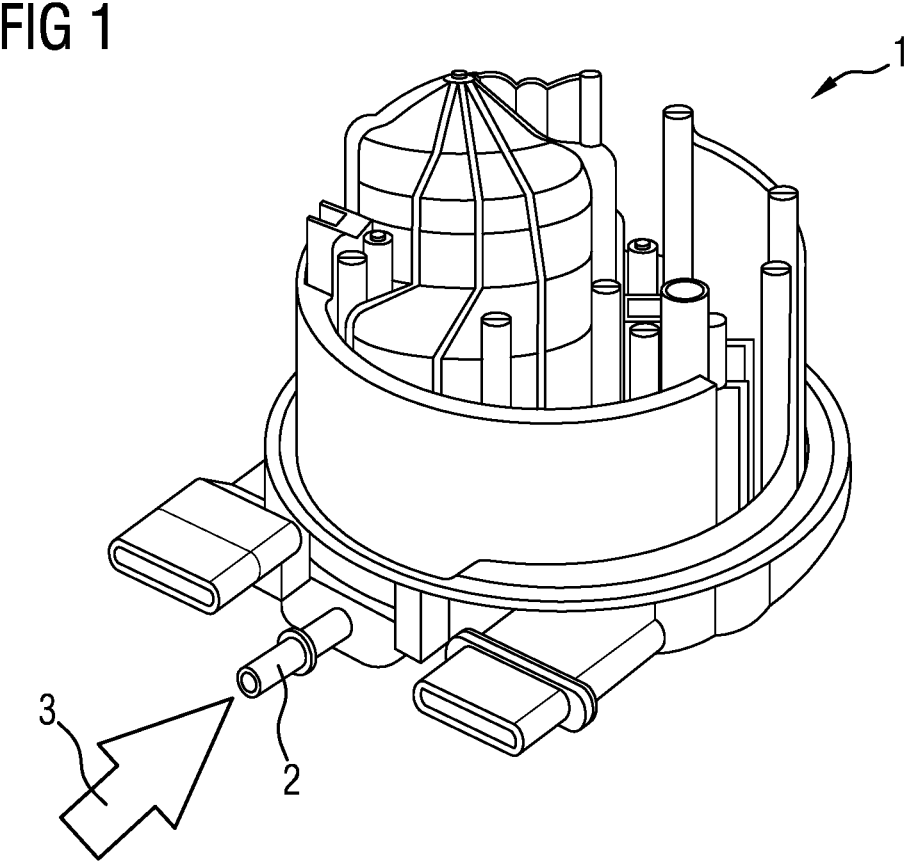
FIG. 1 is a perspective view of the assembly formed by the conveying unit, the filter and the control electronics, wherein in particular the forwardly projecting connection plug can be seen.

FIG. 1 shows an assembly 1 of the water-conveying module, which assembly has a conveying unit, a filter element, control electronics, and electrical connections. For example, a tank into which the assembly shown can be inserted is not shown. The connection plug 2 is arranged downstream of the conveying unit in the main conveying direction. The connection plug 2 is formed as an injection-molded part from a plastic with the base assembly of the assembly 1 and projects therefrom.

A dosing line (not shown) can be plugged onto the connection plug 2 and connected to the connection plug. The connection plug 2 has a smooth outer surface, over which the dosing line can be pushed. Within the connection plug 2, there is formed a through-flowable section, which can be flowed through by the water conveyed from the conveying unit.

Figure 2:
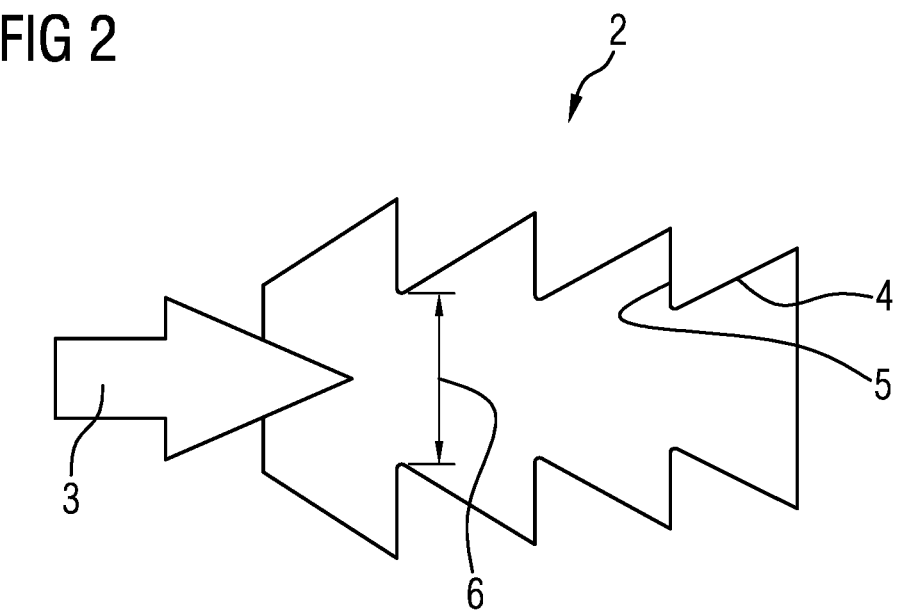
FIG. 2 is a view of a longitudinal section through the connection plug, wherein in particular the through-flowable section of the connection plug is shown.

FIG. 2 shows a longitudinal section through the connection plug 2. In FIGS. 1 and 2, the arrow 3 indicates the water flow direction along which a water flow can arise as a consequence of freezing of the water in or on the connection plug. This is opposite to the normal conveying direction.

In FIG. 2, the configuration of the inner wall of the connection plug 2 can be seen. The line cross section varies along the extent of the connection plug. The inner wall has a serrated contour, whereby a sawtooth-like structure is created. As viewed along the main conveying direction, the line cross section decreases by way of a sloping flank 4 before the line cross section increases again along the flank 5 which is perpendicular to the outer wall. This profile is repeated four times by way of example in the illustration in FIG. 2.

The minimum line cross section 6 is smaller than the line cross section of the outlet channel or of the dosing line, neither of which is illustrated in FIG. 2.

In particular as viewed along the arrow 3, the inner contour of the connection plug constitutes a mechanical filter which, in particular by way of the perpendicular flanks 5 projecting steeply into the through-flowable cross section, can mechanically block solids situated in the water, such as for example ice. The lining-up of said sawtooth-like structures allows the filter path to be lengthened or shortened as desired. A decrease in the minimum line cross section 6 from one sawtooth-like structure to the next is also advantageous, this making it possible for the pressure loss generated by way of the connection plug or the inner structure of the connection plug to also be additionally influenced, whereby the filtering action is further improved.

The different features of the individual exemplary embodiments can also be combined with one another.

The exemplary embodiments in FIGS. 1 and 2 are in particular not of a limiting nature and serve for illustrating the concept of the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results arc within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A water-conveying module configured to inject water into or upstream of a combustion chamber of an internal combustion engine, comprising:
   a conveying unit, comprising:
      a pump configured to convey the water from a tank to an injection point along a dosing line; and
      a water outlet through which water can be conveyed out of the conveying unit, wherein the water outlet is a rigid connection plug onto which the dosing line can be plugged, wherein water can be conveyed from the conveying unit into the dosing line along the connection plug,
   wherein the connection plug has a through-flowable section which can be flowed through by the water and which is part of a fluid line from the conveying unit to the dosing line,
   wherein the through-flowable section has a cross section that varies in diameter along a throughflow direction.

2. The water-conveying module as claimed in claim 1, wherein the through-flowable cross section of the through-flowable cross section narrows from the dosing line toward the conveying unit.

3. The water-conveying module as claimed in claim 1, wherein the through-flowable section has, in a flow direction from the conveying unit toward the dosing line, a line cross section that repeatedly narrows and increases again.

4. The water-conveying module as claimed in claim 1, wherein the through-flowable section has a sawtooth-like contour in a longitudinal section.

5. The water-conveying module as claimed in claim 4, wherein the sawtooth-like contour has a first portion that is perpendicular to a longitudinal axis of the connection plug and a second portion that is angled with respect to the longitudinal axis of the connection plug.

6. The water-conveying module as claimed in claim 1, wherein the through-flowable section has a contour that increases a flow resistance more greatly in a flow direction from the dosing line toward the conveying unit than along a flow direction from the conveying unit toward the dosing line.

7. The water-conveying module as claimed in claim 1, wherein the through-flowable section forms a filter element for fluid which can flow through the through-flowable section, the filter element formed by serrated pockets at a wall which outwardly delimits the through-flowable section.

8. The water-conveying module as claimed in claim 1, wherein a minimum line cross section of the through-flowable section is smaller than a line cross section on a side of the conveying unit and is smaller than a line cross section of the dosing line.

9. The water-conveying module as claimed in claim 1, wherein the connection plug has a constant outside diameter.

* * * * *